Patented Mar. 29, 1932

1,851,511

UNITED STATES PATENT OFFICE

WINFRID HENTRICH, OF WIESDORF-ON-THE-RHINE, ANTON OSSENBECK, OF COLOGNE-MULHEIM, AND ERNST TIETZE, OF COLOGNE-ON-THE-RHINE, GERMANY, ASSIGNORS TO GENERAL ANILINE WORKS, INC., OF NEW YORK, N. Y., A CORPORATION OF DELAWARE

COMPOSITION OF MATTER SUITABLE FOR DYEING

No Drawing. Application filed July 30, 1929, Serial No. 382,276, and in Germany August 3, 1928.

The present invention relates to new compositions of matter suitable for dyeing and printing.

A number of compounds possessing phenolic of enolic character find extensive application in dyeing and printing either as such or in the form of their alkali salts, for example, β-naphthol, or acetoacetic acid anilide and the like as developers for fixing substantive azo dyestuffs on vegetable fibers in order to render the same fast to washing. More recent representatives of the phenolic series are, in the manufacture of ice colors, the 2.3-hydroxynaphthoic acid arylides or the alkali salts thereof or in the enolic series, the diaceto acetyl derivatives of 4.4'-diaminodiphenyl and homologues thereof.

Insofar as such products were in the state of free phenols or enols, the dyer or printer was first called upon to bring the same into solution by a cumbersome procedure, in most cases with the help of caustic alkalies in which connection it was very often essential that any excess of caustic alkali should be avoided, having regard to the intended application of the product, for example, in coupling dyestuffs on the fiber with the use of diazo compounds sensitive to alkalies.

It is, moreover, known that in the manufacture of aqueous solutions of naphtholates, such as for example, the sodium salt of 2.3-hydroxynaphthoic acid anilide or other arylides of this series or of similar compounds, such as, for example, the sodium salts of acetoacetic acid arylide, or on dissolving mixtures of these compounds and other water soluble, neutral or alkaline reacting materials, cloudy solutions filled with flakes are obtained as the result of hydrolysis, due to the slight acidity of the phenolic or enolic hydroxy groups. In order to remedy this disadvantage, it has been necessary in the manufacture of the respective solutions to prevent the hydrolytic clouding by free naphthol and the like by the addition of further quantities of caustic alkali lye.

In accordance with the present invention, there are obtained compositions of matter in the solid form, which are excellently stable and resistant to air and which dissolve very readily in water without the use of any addition, even without the addition of alkali lye, yielding with suitable choice of the relative mixture perfectly clear solutions without a harmful excess of alkali. The process of manufacture in accordance with this invention is by incorporating with a coupling component, containing at least one hydroxy group but being free from a sulfonic or carboxylic acid group, including those compounds of enolic character or with the alkali compound thereof or with a mixture of these compounds, a small quantity of an alkali starch compond (compare, for example, Journal für praktische Chemie, vol. 101, p. 314 et seq. 1921).

The quantity of the alkali starch compound added varies somewhat. When using the coupling component with free hydroxy groups, there are mixed about molecular quantities, that means for each hydroxy group one molecule of the caustic alkali in the form of the alkali starch compound is added. On the other hand, when using the alkali metal salts of the coupling components containing hydroxy groups, only a small quantity of the alkali starch is to be added for preventing the hydrolytic dissociation of the group OMe (Me=alkali metal) of the coupling component. The amount of the dissociation somewhat depends on the specific compound used and on the quantity of the water it is diluted with; therefore the larger the specific dissociation of the compound and the dilution of the aqueous solution prepared, the greater must be the quantity of the alkali starch added for preventing the hydrolytic dissociation.

Other organic or inorganic substances may be added to our new compositions, especially a diazo compound, the diazo group of which is blockaded and is set free by the action of an acid. Such compounds are for example, suitable nitroamines and diazoamino compounds, (compare the copending applications Serial No. 358,153, filed April 25, 1929, and Serial No. 377,075, filed July 9, 1929, for new diazo amino compounds, and application Ser. No. 377,076 filed July 9, 1929 for diazo amino compounds). Those compositions containing besides the alkali starch a diazotizing component, in a blockaded form and in a quantity about equimolecular to the coupling component are especially valuable in the printing process. It is to be understood that both the mixtures containing the coupling components with free hydroxy groups and the alkali metal salts thereof fall within the scope of our invention.

In consequence of the above mentioned remarkable properties the mixtures thus obtained with alkali starch can be employed directly without any auxiliary operations for the purpose of dyeing and printing.

The following examples illustrate the invention without limiting it thereto:

*Example 1.*—100 parts by weight of the dry, finely divided sodium salt of 2.3-hydroxynaphthoic acid o-toluidide (or of 2.3-hydroxy-naphthoic acid-4-chloro-2-methyl-anilide) are intimately mixed with 3 to 8 parts by weight of "alkali starch". The mixture, in contradistinction to the compound free from alkali starch, yields perfectly clear solutions in cold and warm water; it can therefore be used directly for slop-padding vegetable fibers.

*Example 2.*—100 parts by weight of the dry, finely divided mixture of 30 parts by weight of the sodium salt of 2.3-hydroxynaphthoic acid p-anisidide and 70 parts by weight of the diazoamino compound obtained from diazotized 4-chloro-2-anisidine and 4-sulfo-2-aminobenzoic acid (see the copending application Ser. No. 377,076), said diazoamino compound having the formula:

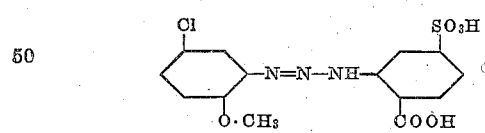

are intimately mixed with 5 parts by weight of alkali starch. The product thus obtained yields a clear aqueous solution, which even on standing shows no hydrolytic clouding.

*Example 3.*—100 parts by weight of 2.3-hydroxynaphthoic acid anilide are intimately ground with 47 parts by weight of alkali starch. The mixture thus obtained remains unchanged in the air and dissolves to a clear solution in warm water. The solution can therefore be used directly for the slop-padding of vegetable fibers.

*Example 4.*—100 parts by weight of acetoacetic acid anilide are intimately ground with 68 parts by weight of alkali starch. The very stable mixture dissolves to a clear solution in water at 40-50° C. The resulting solution can be employed directly for developing the aminodiazo dyestuff of the formula:

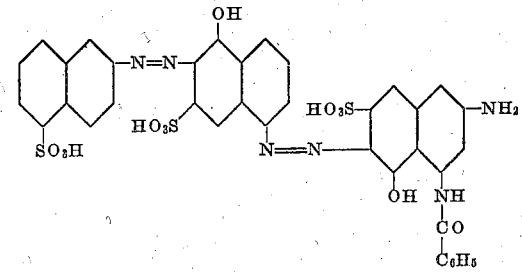

obtained from 2-naphthyl-amine-5-sulfonic acid, 1-amino-5-hydroxynaphthalene-7-sulfonic acid and 4-benzoylamino-2-amino-5-hydroxynaphthalene-7-sulfonic acid, after first dyeing and then diazotizing on the fiber. In this manner vivid green shades are obtained (compare German Patent No. 268792).

In an analogous manner the mixture obtainable from 1-phenyl-3-methyl-5-pyrazolone and alkali starch can also be used as a developer which is stable in the air and soluble in water.

*Example 5.*—100 parts by weight of di-(acetoacetyl)-tolidide are treated as in the above example with 64 parts by weight of alkali starch. The powder, which remains unchanged in air dissolves without any addition to a clear solution in water at 50° C. There can be added to this, for example, suitable nitrosoamines or diazoamino compounds of the kind described, for example, in the copending applications Ser. No. 358153, filed April 25, 1929, Ser. No. 377,075, filed July 9, 1929 for new diazo amino compounds, and Ser. No. 377,076, filed July 9, 1929 for diazo amino compounds. Likewise, any other suitable substances or mixtures of substances of any inorganic or organic nature can be added.

*Example 6.*—100 parts by weight of β-naphthol are intimately ground with 92 parts by weight of alkali starch. The mixture thus obtained is stable to air and readily soluble in moderately warm water. The solution can be used directly for the development, for example, of the aminoazo dyestuff of the formula:

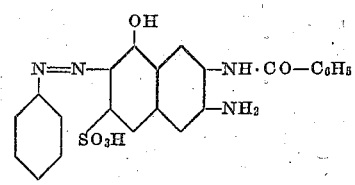

obtained from aniline and 3-benzoylamino-2-amino-5-naphthol-7-sulfonic acid, after first dyeing and then diazotizing on the fiber, when vivid reddish orange shades are produced (compare German Patent No. 151,017).

*Example 7.*—100 parts by weight of sulfazone

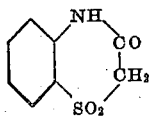

are ground as finely as possible with 64 parts by weight of alkali starch. The mixture is stable to air and dissolves in cold water without any addition to a clear solution. When using 2.4-dihydroxyquinoline the procedure is similar. The solutions obtained from a mixture of the said two compounds and alkali starch are capable of application in an analogous manner to that described in Examples 4 and 6, for example, as developing solutions for fixing substantive azo dyestuffs on the vegetable fiber in order to render the same fast to washing.

We claim:

1. As a new composition of matter a mixture comprising an alkali metal salt of a coupling component containing at least one hydroxy group and being free from sulfonic and carboxylic acid groups, and an alkali starch compound in a quantity necessary for preventing the hydrolytic dissociation of the coupling component in aqueous solution, being resistant to air, soluble in water and having utility in dyeing and printing processes.

2. As a new composition of matter a mixture comprising an alkali metal salt of a coupling component containing at least one hydroxy group and being free from sulfonic and carboxylic acid groups, an alkali starch compound in a quantity necessary for preventing the hydrolytic dissociation of the coupling component in aqueous solution, and a watersoluble diazo-amino compound in a quantity about equivalent to the coupling component, being resistant to air, soluble in water and having utility in dyeing and printing processes.

3. As a new composition of matter a mixture comprising a 2.3-hydroxynaphthoic acid arylide and an alkali starch compound in a quantity necessary for preventing the hydrolytic dissociation of the coupling component in aqueous solution, being resistant to air, soluble in water and having utility in dyeing and printing processes.

4. As a new composition of matter a mixture comprising a 2.3-hydroxynaphthoic acid arylide, an alkali starch compound in a quantity necessary for preventing the hydrolytic dissociation of the coupling component in aqueous solution, and a watersoluble diazo-amino-compound prepared from any diazotizing component free from groups inducing solubility in water and a primary amine containing at least one group inducing solubility in water, in a quantity about equivalent to the coupling component, being resistant to air, soluble in water and having utility in dyeing and printing processes.

5. As a new composition of matter a mixture comprising a 2.3-hydroxynaphthoic acid p-anisidide in form of its sodium salt and an alkali starch compound in a quantity necessary for preventing the hydrolytic dissociation of the coupling component in aqueous solution, being resistant to air, soluble in water and having utility in dyeing and printing processes.

6. As a new composition of matter a mixture consisting of 30 parts by weight of the sodium salt of 2.3-hydroxynaphthoic acid p-anisidide, 5 parts by weight of alkali starch and 70 parts by weight of the diazoamino compound obtained from diazotized 4-chloro-2-anisidine and 4-sulfo-2-aminobenzoic acid, being resistant to air, soluble in water and having utility in dyeing and printing processes.

In testimony whereof, we affix our signatures.

WINFRID HENTRICH.
ANTON OSSENBECK.
ERNST TIETZE.